(12) United States Patent
Spencer

(10) Patent No.: US 7,884,285 B2
(45) Date of Patent: Feb. 8, 2011

(54) SYSTEMS FOR EFFICIENT INSULATION OF ELECTRICAL STRUCTURES

(75) Inventor: Ronald Keith Spencer, Meeker, CO (US)

(73) Assignee: Power Line Sentry LLC, Fort Collins, CO (US)

( * ) Notice: Subject to any disclaimer, the term of this patent is extended or adjusted under 35 U.S.C. 154(b) by 16 days.

(21) Appl. No.: 12/471,153

(22) Filed: May 22, 2009

(65) Prior Publication Data

US 2009/0294170 A1  Dec. 3, 2009

Related U.S. Application Data

(63) Continuation of application No. 11/713,453, filed on Mar. 2, 2007, now Pat. No. 7,538,277, which is a continuation of application No. 10/061,097, filed on Feb. 1, 2002, now Pat. No. 7,196,265.

(60) Provisional application No. 60/266,187, filed on Feb. 2, 2001.

(51) Int. Cl.
*H01B 17/00* (2006.01)

(52) U.S. Cl. .............................. 174/138 F; 174/138 R; 174/135; 174/5 R; 52/101

(58) Field of Classification Search .................. 174/5 R, 174/5 SB, 138 F, 139, 186, 138 R; 52/101; 248/74.4; 119/172
See application file for complete search history.

(56) References Cited

U.S. PATENT DOCUMENTS

| | | | |
|---|---|---|---|
| 2,907,812 A | 10/1959 | Sorflaten et al. |
| 3,797,162 A | 3/1974 | Conibear |
| 3,835,238 A | 9/1974 | West |
| 3,958,379 A | 5/1976 | Williams et al. |
| 4,234,753 A | 11/1980 | Clutter |
| 4,280,013 A | 7/1981 | Clutter |
| 4,359,844 A | 11/1982 | Hoggard et al. |
| 4,405,828 A | 9/1983 | Shook |
| 4,620,059 A | 10/1986 | Sherman |
| 4,628,145 A | 12/1986 | Kolcio et al. |
| 4,748,778 A | 6/1988 | Rafter |
| 4,845,307 A | 7/1989 | Cumming et al. |

(Continued)

FOREIGN PATENT DOCUMENTS

GB  2153644 A  8/1985

OTHER PUBLICATIONS

"Bird Guard Crossarm Construction", Pacer Industries, which includes a newspaper article from the Oct. 21, 1990 section B Salt Lake Tribune, and a price sheet, seven pages.

(Continued)

*Primary Examiner*—Dhiru R Patel
(74) *Attorney, Agent, or Firm*—Santangelo Law Offices, PC

(57) ABSTRACT

An animal protectant power line electrical insulator to be placed on structures such as electrical apparatus to protect birds, wildlife and other animals. Specifically the insulator may include, a snap-fit insulating cover configured to fit over an energized part of an electrical structure of a power line, a resiliently flexible separable juncture for application onto the power line and secure closure; and perhaps even at least one formed eye on the cover. A cover may hold itself in place and may be made from plastic, fiberglass, PVC, or other semi-rigid, non-conductive material; molded, formed, or fabricated to fit a desired application.

13 Claims, 11 Drawing Sheets

U.S. PATENT DOCUMENTS

| | | | |
|---|---|---|---|
| 4,962,620 A | | 10/1990 | Mastalski |
| 5,153,383 A | | 10/1992 | Whited et al. |
| 5,299,528 A | | 4/1994 | Blankenship |
| D357,458 S | | 4/1995 | Tisbo |
| 5,650,594 A | | 7/1997 | Urnovitz |
| 5,700,024 A | | 12/1997 | Upchurch |
| 5,794,495 A | | 8/1998 | Anderson |
| 5,864,096 A | * | 1/1999 | Williams et al. ............ 174/139 |
| 5,873,324 A | | 2/1999 | Kaddas et al. |
| 5,936,197 A | | 8/1999 | Katoh et al. |
| 5,950,354 A | | 9/1999 | Carnwath |
| 6,005,196 A | | 12/1999 | Spillyards |
| 6,257,537 B1 | | 7/2001 | Williams |
| 6,303,870 B1 | * | 10/2001 | Nazaryan et al. ............ 174/172 |
| 6,770,809 B1 | * | 8/2004 | De France .................. 174/5 R |
| 7,009,102 B2 | * | 3/2006 | Milner ....................... 174/5 R |
| 2002/0117313 A1 | | 8/2002 | Spencer |

OTHER PUBLICATIONS

E-mail letter from Bob Hartman of Kaddas Enterprises, Inc. to Mr. Dominic Spencer, Mar. 17, 1999, one page.

"Snap Fit Bird+GuarD II", Kaddas Enterprises Inc. Brochure, p. 3.

"Outage Protection for Power Lines," Kaddas Enterprises, Inc. p. 1-7, www.kaddas.com/eline, downloaded Feb. 20, 2003.

"Pacer Bird Guards, Bird or Raptor Guards; Insulator Protectors, Perches", Pacer Industries, Inc. Brochure, 2 pages.

"Pole/Crossarm Fittings, B2571 Bird Guard and B2502-Q Raptor Perch", Hughes Brothers, Inc., p. C-26 to C-27, 1995.

Snap-fit Bird+GuardD for Horizontal Insulator; Snap Fit Bird+GuarD II LP; Triangle Anit-Purch;, Kaddas Enterprises Inc. 1999.

File wrapper from priority case: U.S. Appl. No. 10/061,097, Raptor Guard System, filed Feb. 1, 2002 (available online).

U.S. Appl. No. 60/180,499, Raptor Guard System, filed Feb. 2, 2000, 11 pages and 7 drawings.

U.S. Appl. No. 60/266,187, Raptor Guard System, filed Feb. 2, 2001, 17 pages and 11 drawings.

File wrapper from priority case: U.S. Application No. 11/713,453, Systems for Safe Securement of Saddle Items to Electrical Structures, filed Mar. 2, 2007 (available online).

* cited by examiner

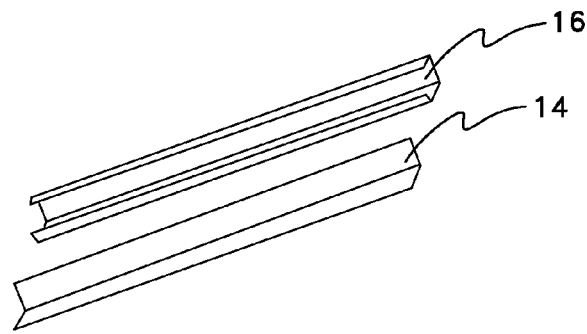
Fig. 9A
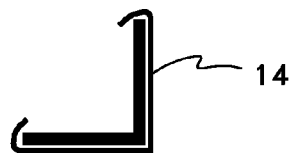
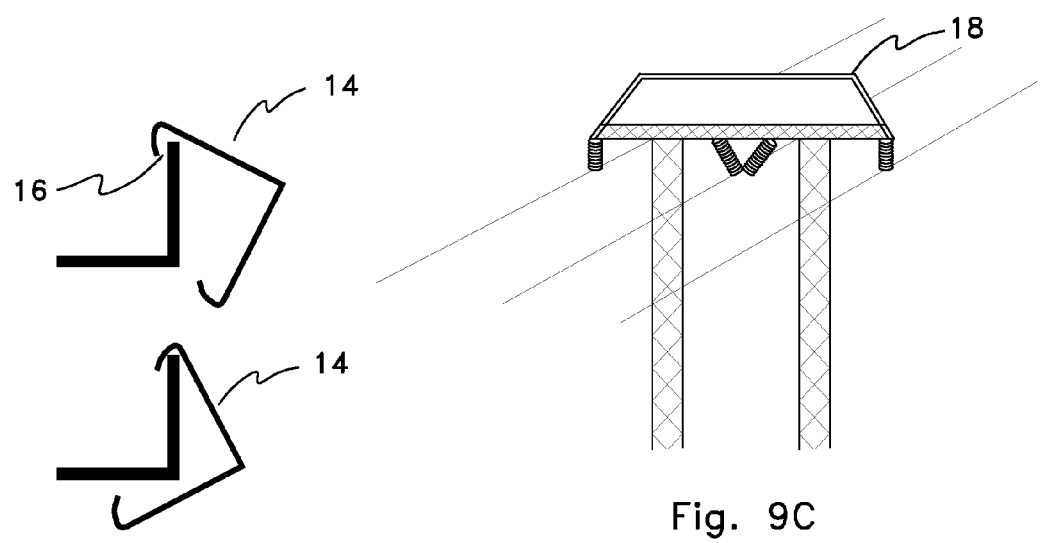
Fig. 9B
Fig. 9C

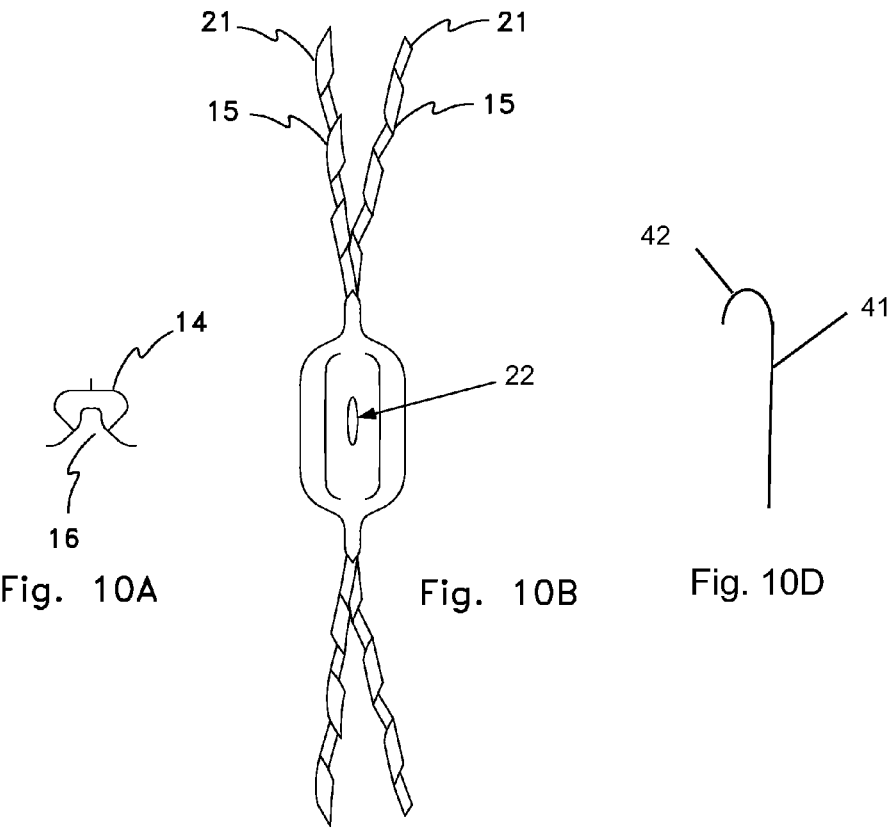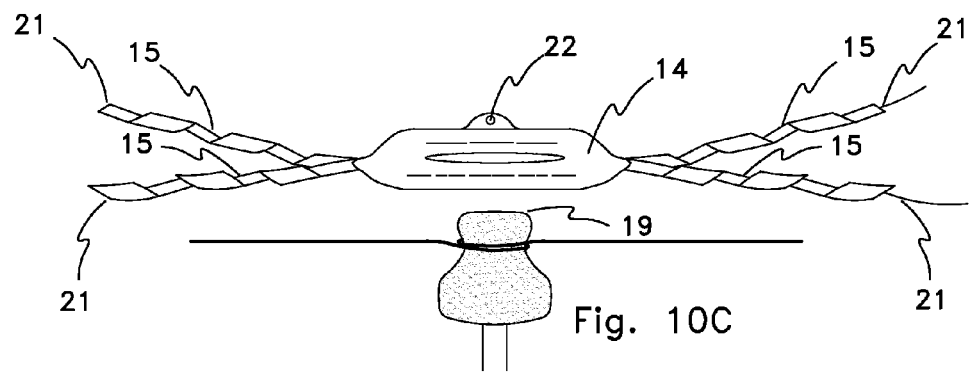
Fig. 10A  Fig. 10B  Fig. 10D
Fig. 10C

SYSTEMS FOR EFFICIENT INSULATION OF ELECTRICAL STRUCTURES

This application is a continuation of U.S. application Ser. No. 11/713,453, filed Mar. 2, 2007, now U.S. Pat. No. 7,538,277 which is a continuation of U.S. application Ser. No. 10/061,097, filed Feb. 1, 2002, now U.S. Pat. No. 7,196,265 which claims the benefit of U.S. Provisional Application No. 60/266,187, filed Feb. 2, 2001, each hereby incorporated by reference herein.

BACKGROUND OF THE INVENTION

In general, an animal deterrent system having various embodiments which may be mounted onto a variety of structures provide protection for both the animals and the structures.

It is difficult to deter animals from using man-made or naturally occurring structures. Whether it is birds which alight on power structures to perch or other animals which climb up structures to reside, animals cause significant damage to structures. For example, when animals inadvertently contact adjacent energized power lines the resulting short circuit may result in power outages interrupting the electrical service to utility customers. Conversely, man-made structures cause harm to animals. For example, animals which climb or perch upon electrical power structures may be electrocuted by contacting adjacent energized power lines or by grounding the power line to the supporting structure. As a result of animals climbing or perching on electrical power structures, electric utilities are plagued with outages, bumps, spikes and dips on their electrical systems.

Electrical utilities also have to comply with the federally mandated Migratory Bird Treaty Act and The Eagle Protection Act, hereby incorporated by reference. Under this federal law, electric utilities are required to protect a large number of birds from possible electrocution. Large fines have been levied against electric utilities in instances where electric utilities neglected to protect birds. See, *USFW vs. Moon Lake Electric Co-op Assn.* (1999), hereby incorporated by reference. Utilities are now taking great measures in order to insure that their systems and structures are safe for birds.

As a result of the foregoing, there is a large and growing commercial market for animal deterrent systems. The market continues to grow as more structures are built, such as power transmission structures, in even the most remote animal habitats. Because there is a large commercial demand for animal deterrent systems, the devices designed to deter animals have taken a variety of forms such as those disclosed in U.S. Pat. Nos. 4,359,844; 5,299,528; and 5,650,594. In spite of the variety of animal deterrent devices available, substantial problems remain unresolved discouraging their general use. As such, the demand for innovations in animal deterrent technology remains high and consumers are eager to try each new concept as it becomes available.

A significant problem with conventional animal barrier systems can be the lack of a visual deterrent. Visual deterrents may be effective where mechanical barriers are not. Most conventional animal deterrent systems provide a physical barrier which prevents the animal from contacting the structure. However, animals may learn to work around or use the barriers as perches. Visual barriers deter the animal from a distance and prevent contact with the deterrent. Without physical contact with the deterrent device the animal does not have the opportunity to devise behaviors which mitigate its effectiveness.

Another significant problem with conventional animal deterrent devices can be that the mechanical barrier is not conformable to different sizes of animals. It may be simultaneously desirable to deter animals of a certain size range from perching or using a structure while allowing animals outside that size range access to the structure. Many conventional animal deterrent devices do not provide mechanical barriers which can be adjustably conformed to deter animals based upon their physical size. As such, conventional animal deterrent devices may prevent animals from using a structure even when they do not pose a risk and at the same time may be ineffective in deterring animals which do pose a risk to the structure.

A significant problem with conventional animal deterrent devices may be that installation of the devices requires line workers to violate safe working clearances of energized electrical equipment in order to place the bird protection systems on the electrical structure. Recently, OSHA and NEC have adopted safety regulations regarding the safe working distance for persons working on high voltage power lines. The recommended minimum distance to be maintained is 2'-1" between the installer and the power line when working on installations over 600 volts. These regulations require that the deterrent device be designed so as to be installed with a hand held extension a threshold requirement which may not be met by existing animal deterrent devices.

Another significant problem with conventional animal deterrent devices can be that to safely install many of the convention deterrent devices requires at the very least, two line workers, for example, as disclosed by U.S. Pat. No. 4,359,844. An aerial device such as a dialectically insulated bucket truck may also be required as indicated in U.S. Pat. No. 5,650,594. Thus, the cost of installation may become prohibitive.

Another problem with conventional animal deterrent devices can be that the method of fastening the animal deterrent devices requires altering the structure by drilling into the structure to apply bolts, screwing the rigid forms of the bird protection systems to the electrical structures, or driving nails or lag bolts into the wooden structure. All of these procedures are not only time consuming and difficult, but once again dangerous considering the locations where the bird protection systems need to be placed in order to be effective. Moreover, although the conventional animal deterrent devices can be fastened to wooden electrical structures securely at the time of installation, through years of weather abuse, freezing, warming, soaking and drying, as well as the constant vibration caused by crosswinds on the spanning conductors, the fasteners may become loose and unstable. In some instances, the bird deterrent devices topple over due to mechanical failure and become a worse hazard than if no protective measure had been taken in the first place. Also, when the items are attached by using driven lag bolts and nails, the integrity of the structure can be compromised.

Yet another problem with conventional animal deterrent devices which are designed to be positioned at a safe distance from the structure can be expense. Many designs are complex, contain various moving parts or spring loaded components as, for example disclosed by U.S. Pat. No. 5,299,528 or the raptor guard produced by Pacer Industries of Twin Falls, Id. The high price of these complex units may be a major obstacle for the consumer in acquiring an animal deterrent device.

Still another problem with conventional animal deterrent devices which have numerous component parts can be the time and difficulty involved in storage, transporting, or installation. Another problem with conventional animal deterrent devices with numerous mechanical components can be that the components eventually wear out become a hazards either because they can fall from the structure or may come into contact with energized electrical lines.

Yet another problem with conventional animal deterrents may be that they cause static or radio interference.

With respect to conventional animal deterrent devices the above-mentioned problems may occur separately or in combination. The instant invention addresses every one of the above-mentioned problems in a practical fashion.

SUMMARY OF THE INVENTION

The broad objective of this invention is to provide animal deterrent devices to save animals from electrocution, and to save consumers and power companies the costly inconvenience of electrical power outages.

A significant objective of the perching deterrent is to provide a variably sized visual and mechanical animal deterrent having interchangeable mounts to deter animals from using structures which may be man-made or may be naturally occurring. The devices and methods disclosed to achieve a variably sized visual and mechanical animal deterrent are varied and may be incorporated into a variety of animal deterrent components and may be used in numerous animal deterrent applications. Naturally, as a result of these several different and potentially independent aspects of the invention, the objects of the invention are quite varied.

Another significant object of an embodiment of the perching deterrent invention can be to provide a mechanical deterrent which deters animals according to their size.

Another significant object of an embodiment of the perching deterrent invention can be to provide a visual barrier to animals.

Another object of an embodiment of the perching deterrent invention can be to allow installation of the invention in a safe manner and in compliance with existing rules and regulations.

Another object of an embodiment of the perching deterrent invention can be to reduce the number of persons required to install an animal deterrent device.

Yet another object of an embodiment of the perching deterrent invention can be to minimize the alterations made to the structure on which an animal deterrent device is installed.

Still another object of an embodiment of the perching deodorant invention can be to reduce the number of components which make up the animal deterrent device.

Another object of an embodiment of the perching deodorant invention can be to reduce static or radio interference from components which make up the animal deterrent device.

A significant object of the animal deterrent inventions may be to provide a snap fit cover for numerous shaped electrical insulators.

Another significant object of the animal deterrent inventions may be to provide integral electrical conductor wraps.

Another significant object of the animal deterrent inventions may be to provide vibration dampening for electrical lines.

Naturally, further independent objects of the invention are disclosed throughout other areas of the specification.

BRIEF DESCRIPTION OF THE DRAWINGS

FIGS. 9A-C show particular embodiments of the insulating cover invention for use with structural angle.

FIGS. 10A-D show particular embodiments of the insulating cover invention for use with a typical pole top insulator.

DETAILED DESCRIPTION OF THE PREFERRED EMBODIMENTS

Figure 1:
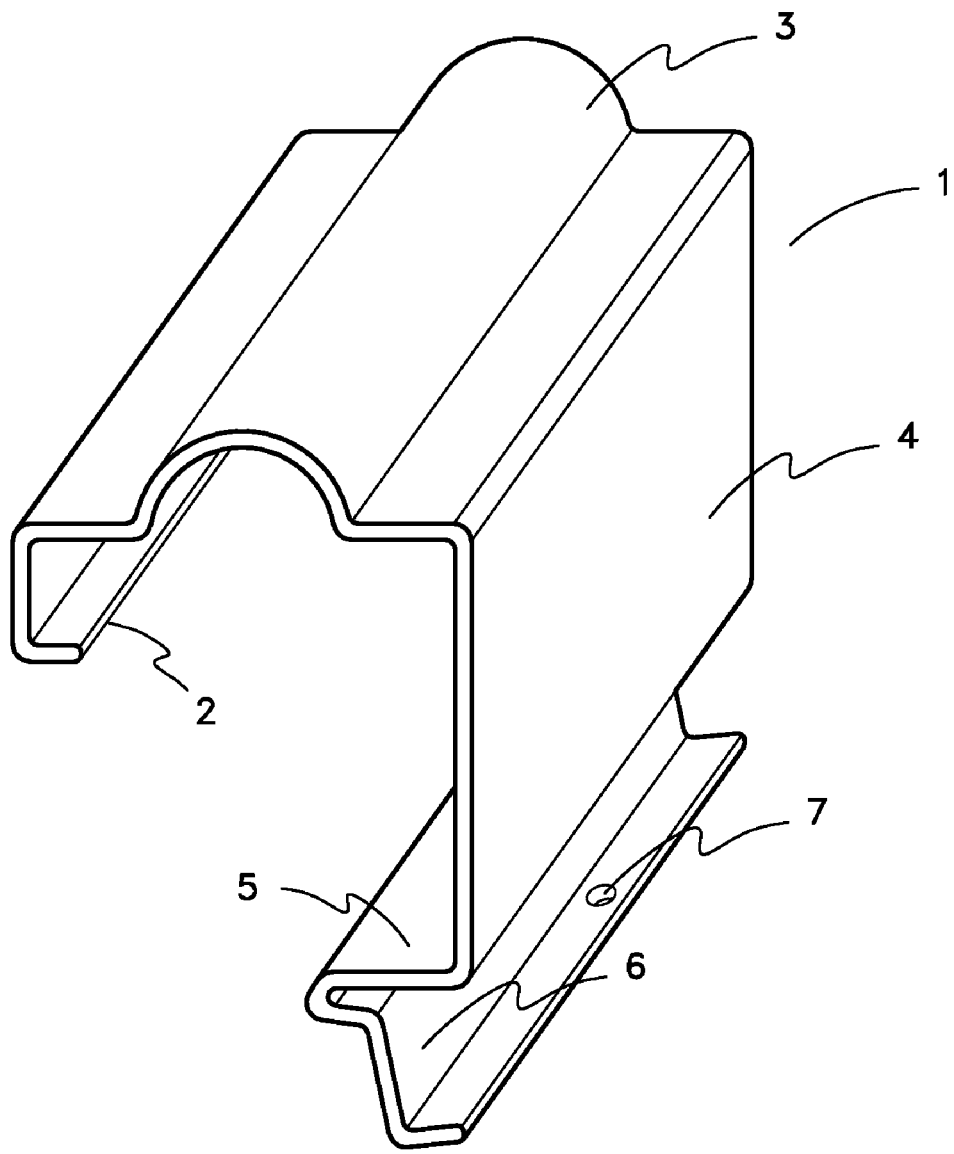
FIG. 1 shows a perspective of a particular embodiment of a saddle invention.

The instant animal deterrent inventions provide cost-effective, non-electrically conductive products which can be safely, easily and efficiently placed on a naturally occurring or man-made structure such as an energized electrical structure. The animals for which the deterrents are intended could be small such as squirrels or raccoons, or could be larger such as a cats, or could be a bird such as a eagle, hawk, owl, falcon or the like.

Now referring primarily to FIGS. 1 to 7, the first animal deterrent invention described involves a variably sized visual and mechanical animal barrier which may be coupled to a variety of interchangeable mounts to deter animals from using structures.

The invention may be conformed to effectively measure the size of the animal for which the deterrent is intended and provides a mechanical deterrent for that size of animal. This aspect of the invention simultaneously allows smaller birds, for example, which because of their small size and short wingspan are not in danger of electrocution, to land and safely perch on the invention while larger birds are deterred.

A visual barrier is also provided. The unique X design embodiment of the invention with upright braces provide a visual barrier, as well as a physical barrier, to birds desiring to land on an electrical structure. This aspect of the invention provides a first deterrent to animals and birds so that they may not contact the animal deterrent device at all.

The invention can be installed either with the use of a "hot stick" (an electrically insulated rod (41) common for use on electrical structures), or can be manually placed on non-energized structures.

Two simple, yet effective components may be used separately or combined in various combinations to make various embodiments of the invention. With regard to a first embodiment of the invention and referring to FIGS. 1 and 2, the saddle, such as an interchangeable animal deterrent mount (1), may be produced from a plastic, such as styrene or PVC, or may be produced from other conformable, non-conductive materials, which may be molded or configured to fit the desired structure. The saddle may further comprise various other elements. The first may be the inwardly curved upper lip (2) of the saddle. This inwardly curved lip, with a sharp edge on the inside, will first gauge how far to the unit needs to be applied onto the desired structure, and then when the unit is applied, will flex to hold the saddle fast against the structure. The sharp inside edge of the inwardly curved lip will then hold fast against the first side of the structure. The lip (2) on the saddle may be formed in such a way to first gauge when the unit is placed completely over the structure. It may be preferred that the end of the lip is cut at such an angle to produce a sharp edge which may grip the structure, holding that portion of the saddle in place while the rest of the saddle is snapped into place. Once the entire unit is pulled into place, the lip may then remain flexed, helping to insure the tight and secure fit of the saddle.

The second element of the saddle invention may be the curved crown (3), an area molded specifically on the saddle to fit a variety of accessories. One of the features of this crown is that it allows the uppermost portion of the saddle to bend and flex open enough to encompass the girth of the structure, while also having elastic memory to pull the saddle back tight against the structure. A fastening bolt can be placed through the crown to allow the unit to be remotely mounted in an inverted position. The crown fits against the second side of the structure. The back of the saddle (4) can be an area designed to specifically fit the third side of the structure where the unit will be applied, is also resilient, with elastic memory to form and hold the saddle tight against the applied area. The heel of the saddle (5) can be inwardly molded and pre-formed into a shape that will fit partially over the fourth side of the structure where the unit will be applied. Extending from the heel of the saddle (5) is found the gripping extension (6), an area which is designed to extend a specific length, at a specific angle, to accommodate the unit's application with a hot stick. The angle of the gripping extension on the flexible base, and the corresponding holes through the gripping extension, are such as to maximize the gripping ability of the fastener by pulling the saddle tight against the structure. Also, the flex of the base may act in such a way as to maintain pressure against the fastener to keep the fastener secured.

At the butt of the gripping extension is an aperture (7), angled as is the gripping extension, which may hold a non-corrosive threaded eye-screw (8). The preferred fastener, a threaded eye-screw may have an eye large enough to accommodate the gripping end of any brand of hot stick (an electrically insulated tool, varying in length from about six feet to about twelve feet, made to apply such items to energized electrical equipment and commonly used by line workers). Other securement hardware might also be used. When the eye-screw (8) is tightened, through the gripping extension (6), and through the heel of the saddle (5), it may contact the structure where the saddle has been applied and may effectively pull the saddle tightly onto the structure, and in the instance of softer materials (wood, fiberglass.) may enter the material to better secure the saddle to the structure. The angle may be such as to flex the saddle's lip, crown, back and heel, so that through years of exposure the saddle may remain secured to the structure. Also, the area where the non-corrosive eye-screw may extend through the gripping extension and heel of the saddle, act in a locking way to prevent any added fasteners which may be used here, from loosening due to weather, temperature differences and vibration.

Referring now primarily to FIGS. 3 through 7, a second invention may be the deterring extension (9) which can be made from any non-corrosive, dielectric materials. These deterrent extensions can be made in various pre-measuring configurations, and produced in various lengths, to provide the appropriate visual barrier. The deterrent extensions (9) may be attached to the crown of the saddle, and may then project out on either side of the main body of the saddle. The units may protrude a desired length and then may bend at an angle (11) greater than 90 degrees, so at a point the deterrent extensions so as to cross (12). The length and bending radius of the deterrent extensions (9) provide a pre-measure element (13) to which a bird wishing to perch on the desired location protected by the invention is physically compared. The pre-measure element (13) may be shaped in such a way to prevent a bird from perching, or allow the bird to perch but be electrically insulated, the shape also allows smaller birds, those not in danger because of their size and short wingspan, to safely land, and ultimately provides these smaller birds a safe area away from energized electrical conductors.

Figure 4:
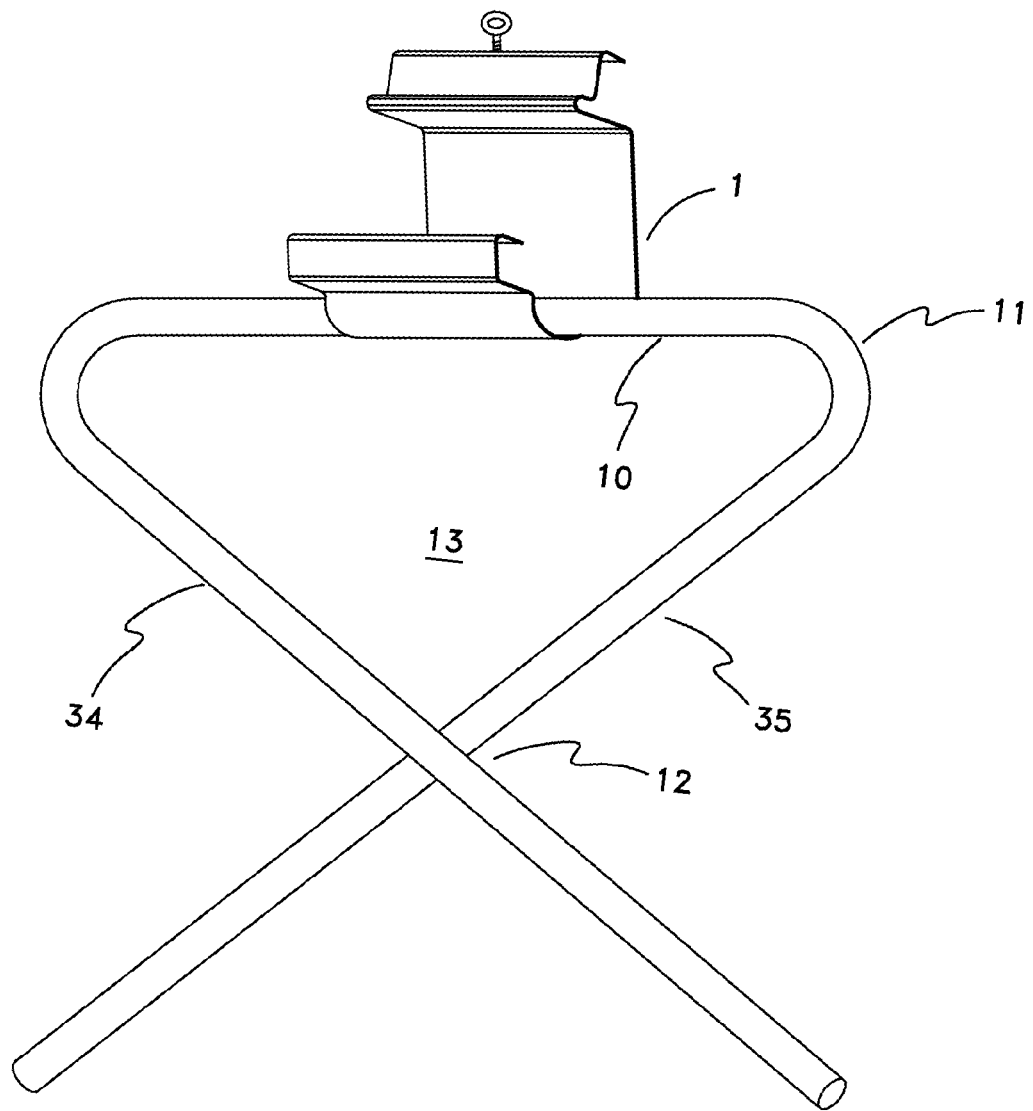
FIG. 4 shows a particular embodiment of a combination of the saddle invention and the deterrent extensions invention.
Figure 5:
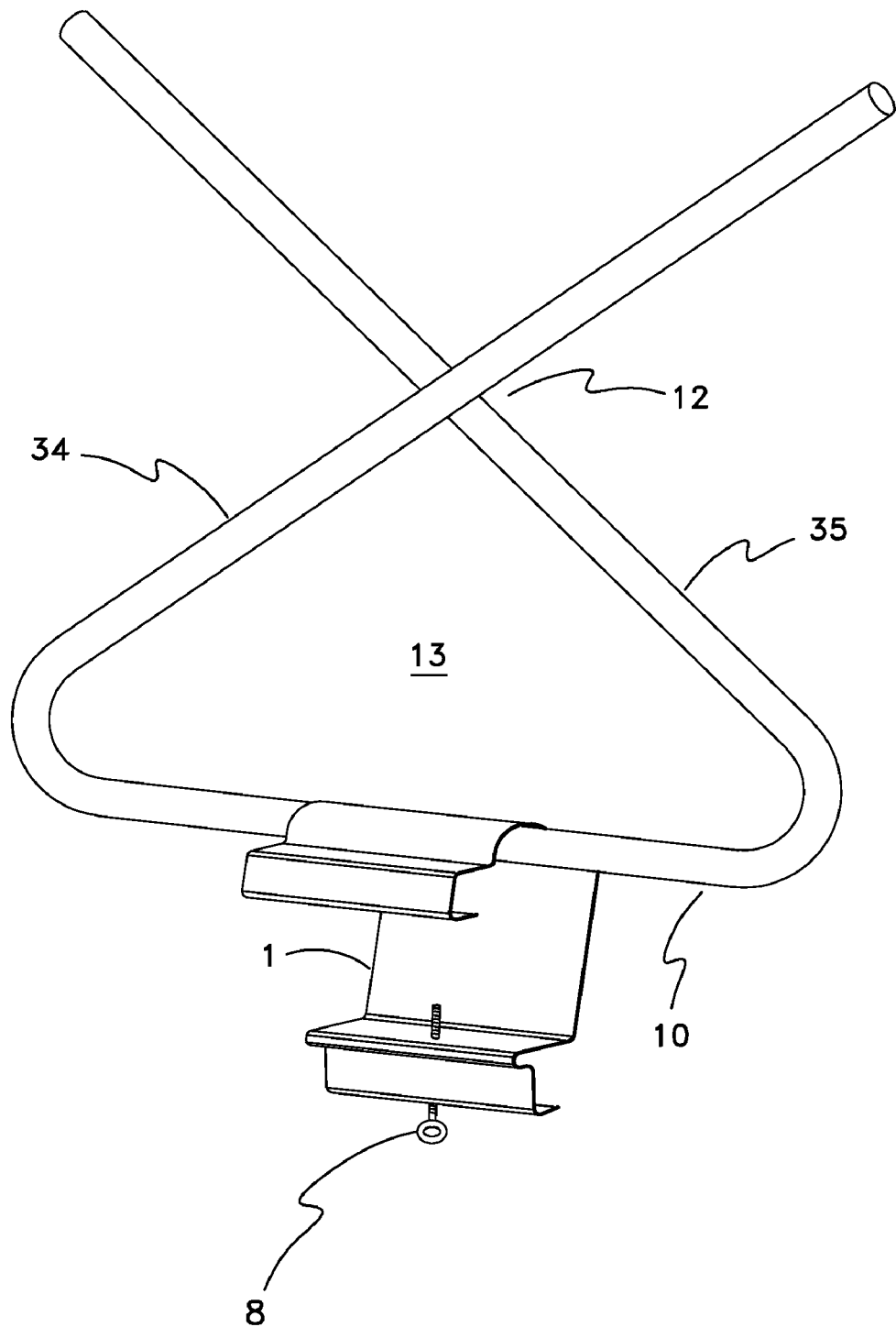
FIG. 5 shows a particular embodiment of a combination of the saddle invention and the deterrent extensions invention.
Figure 6:
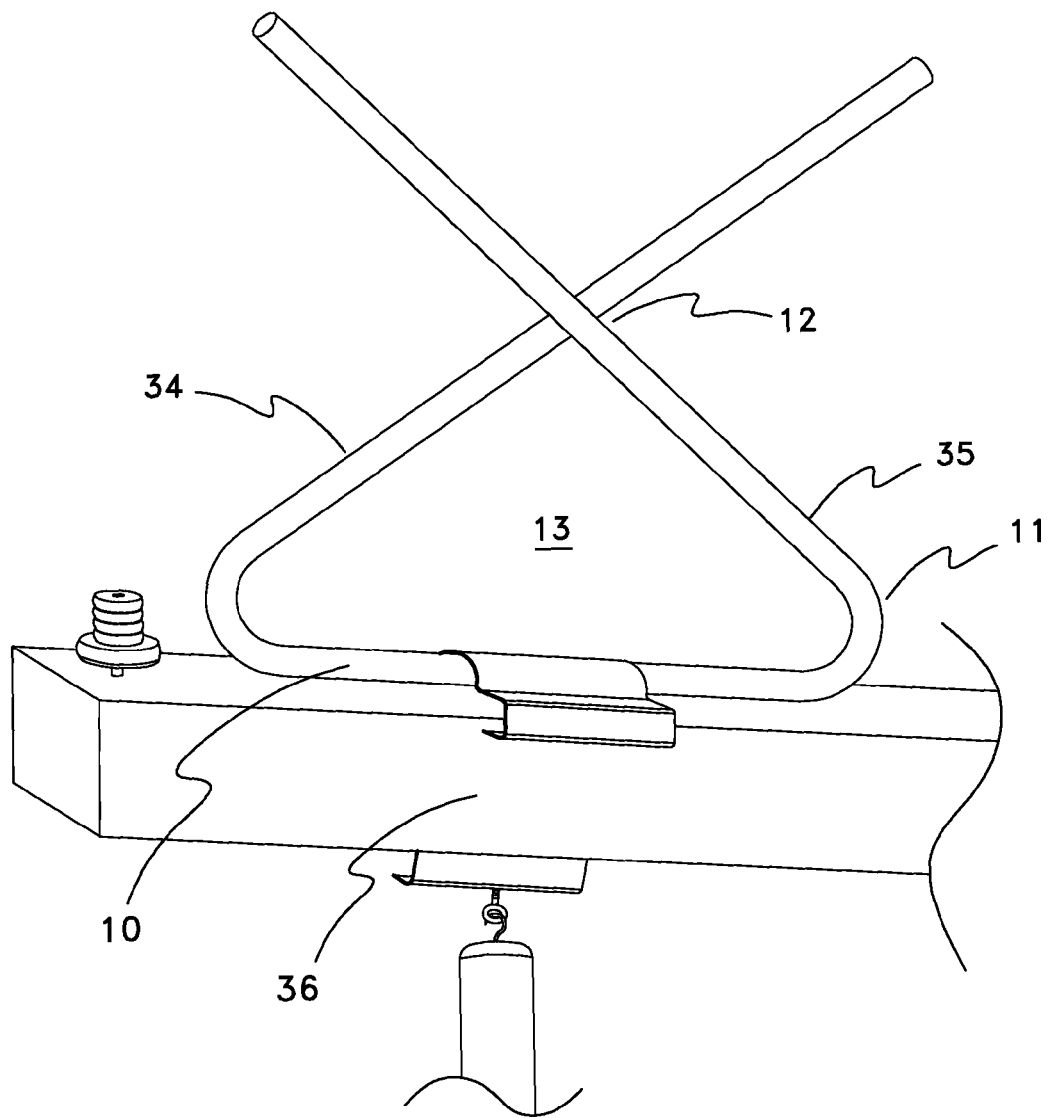
FIG. 6 shows a method of installing a particular embodiment of the saddle invention coupled to a particular embodiment of the deterrent extensions invention.

As shown by FIGS. 4 and 5, another embodiment of invention may be the use of the saddle and deterring extension in combination. In this embodiment of the invention the saddle is formed so as to conform to the cross member of a utility pole. The deterring extensions (9) are configured to provide a pre-measure element for larger birds such as raptors. As shown in FIG. 5, the combination of the saddle and the deterring extensions (9) may be installed so as to project downward from the cross piece. Naturally, they could be designed so as to have any desired orientation to the cross piece or other structural component.

Figure 7:
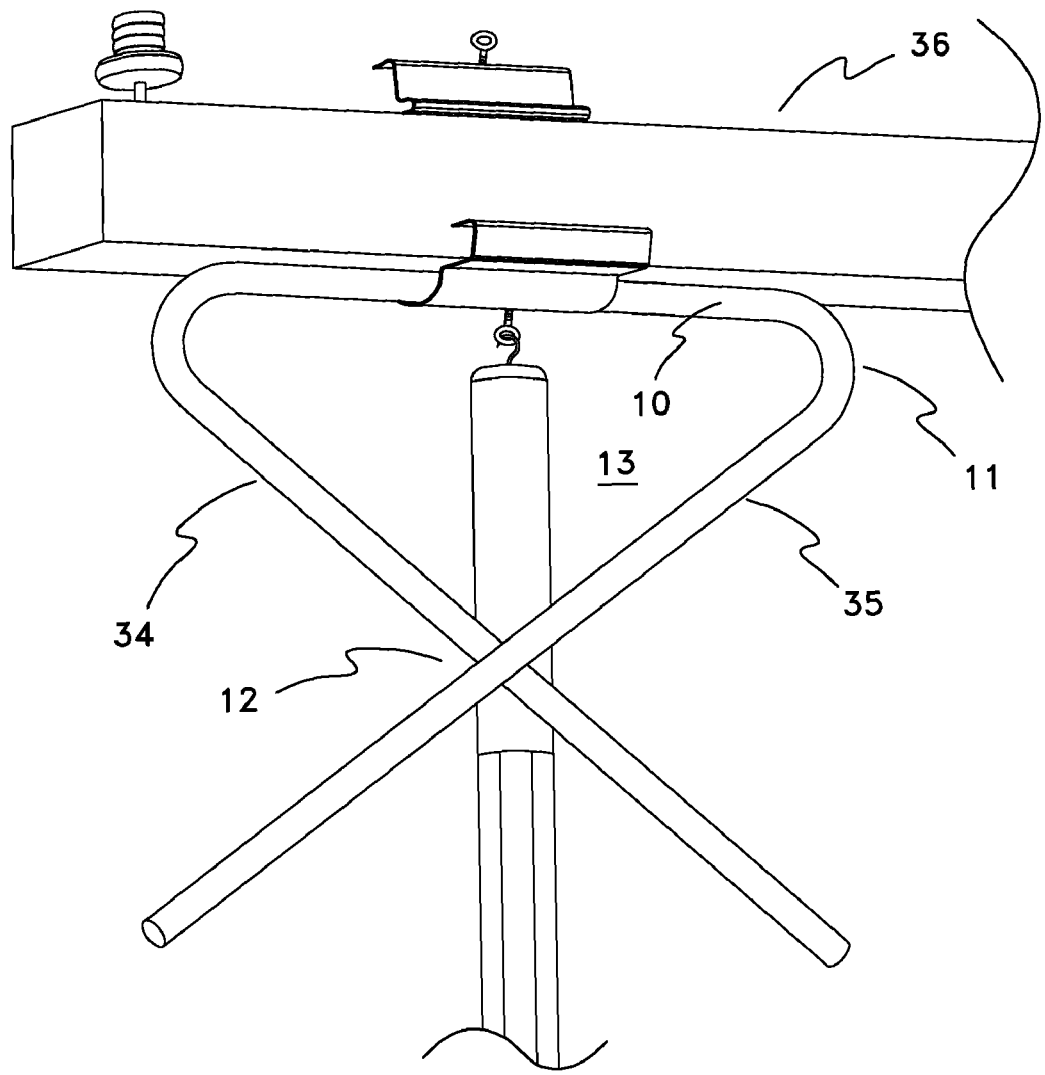
FIG. 7 shows a method of installing a particular embodiment of the saddle invention coupled to a particular embodiment of the deterrent extensions invention in a reversed orientation.
Figure 8A:
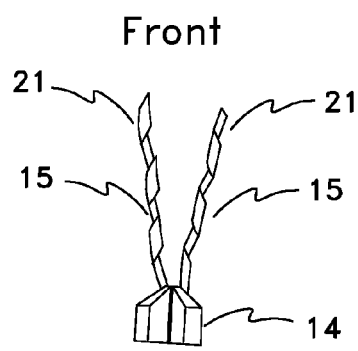
FIGS. 8A-E show particular embodiments of the insulating cover invention for use with an insulated bushing.
Figure 8B:
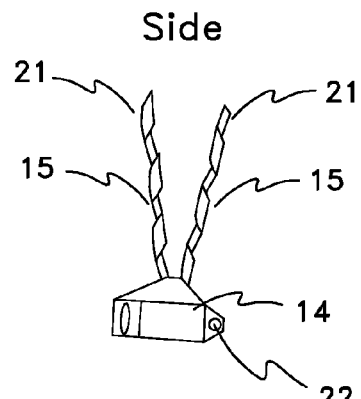
Figure 8C:
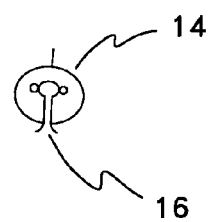
Figure 8D:
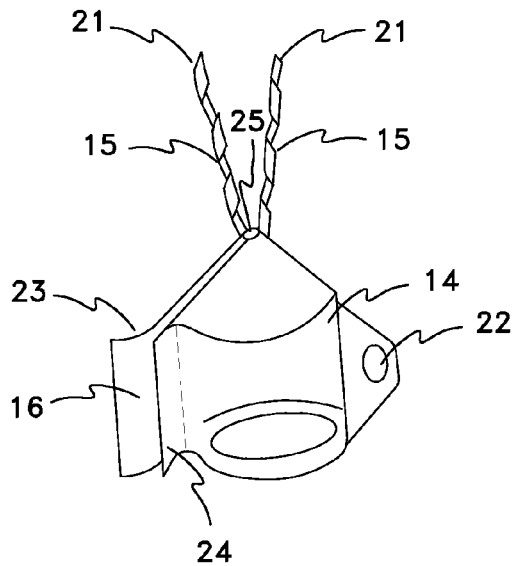
Figure 8E:
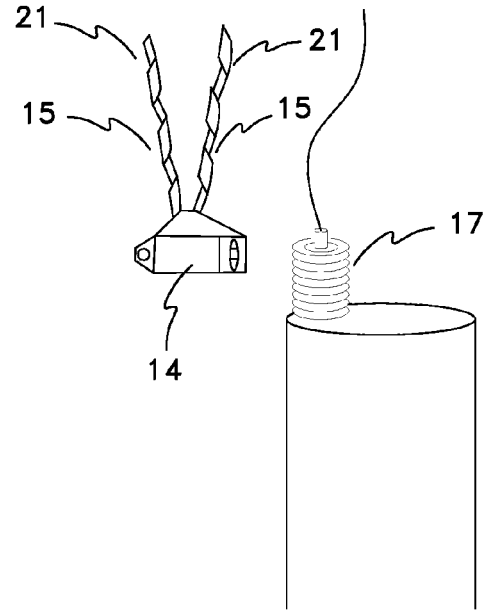

An embodiment of the invention may allow utilities to safely install a animal deterrent on their electrical structures or systems, allowing line workers to place protection devices in desired locations, while maintaining a safe working distance from energized electrical conductors. As shown in FIG. 7, an embodiment of the invention can easily be placed by one line worker on a desired structure, saving time, labor and ultimately cost to the utility. To place the invention on a cross arm of a utility pole, for example, an installer simply grips the eye-screw or other hardware with the hook (42) on the end of the hot stick as represented in FIG. 10D. From a distance of more than four feet and possibly up to twelve feet, the installer may place the invention over the cross arm in the desired location. The installer then pulls down on the hot stick, thus snapping the invention down over the cross arm and into place. The eye-screw or hardware may then be tightened. The hot stick is then released from the eye-screw and the process is complete.

An embodiment of the invention, when made from non-conductive, weather resistant, or non-corrosive materials the unit may endure the most extreme conditions, and may provide years of service. The non-conductive nature of the invention may serve to protect the line workers, as well as animals and birds which might contact the unit at the same time that they contact energized conductors and equipment.

Embodiments of the invention may be produced from semi-rigid material with elastic memory, which allows for it to be just as easily installed in an inverted position, as in an upright position as shown by FIG. 7. If one simply moves the threaded eye-screw from the gripping extension, to the crown of the unit, it may snap onto the electrical structure and tighten in the same fashion as if mounted in the upright position.

Figure 2:
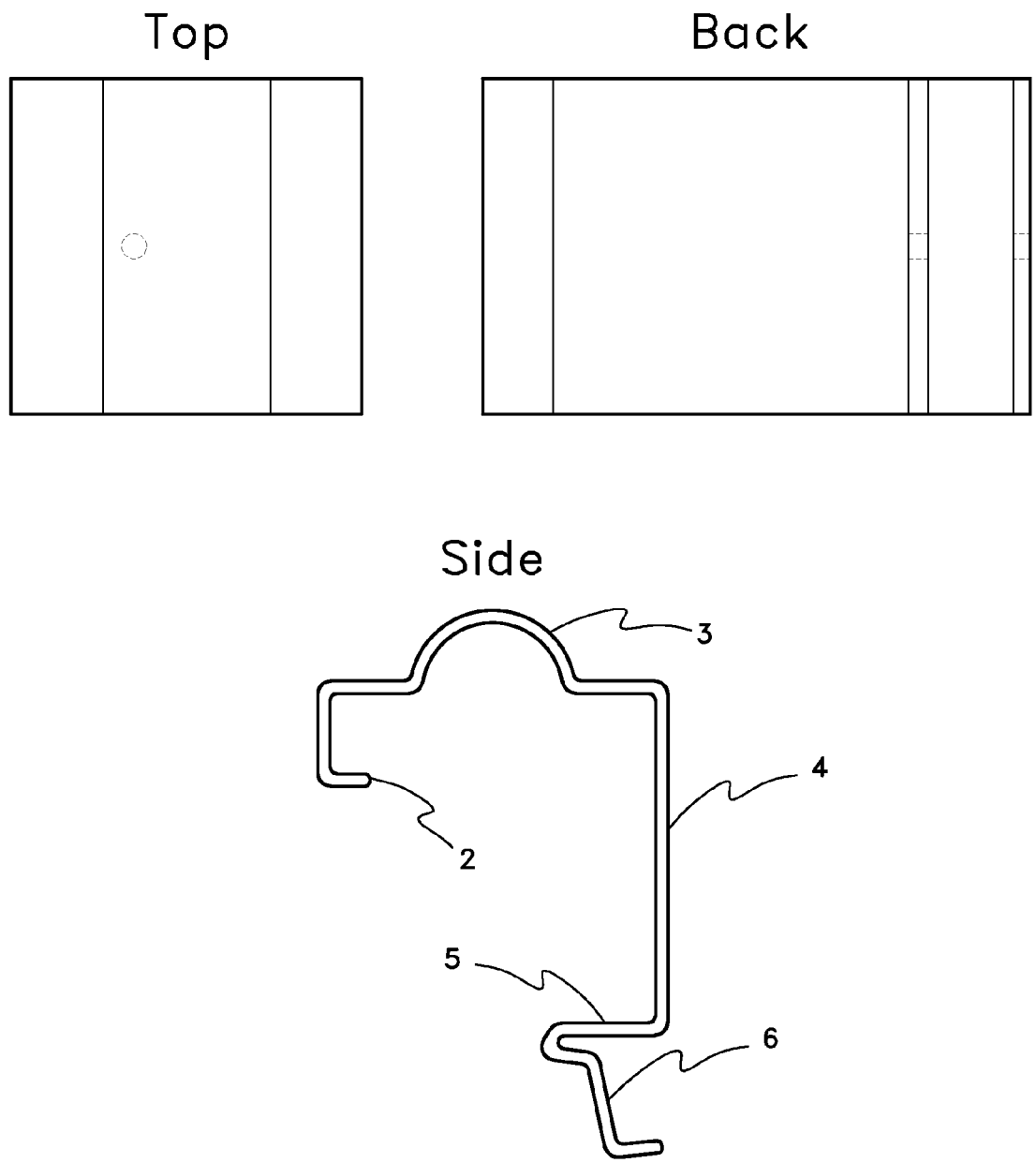
FIG. 2 shows a side view, a top view, and a back view of a particular embodiment of the saddle invention.
Figure 3:
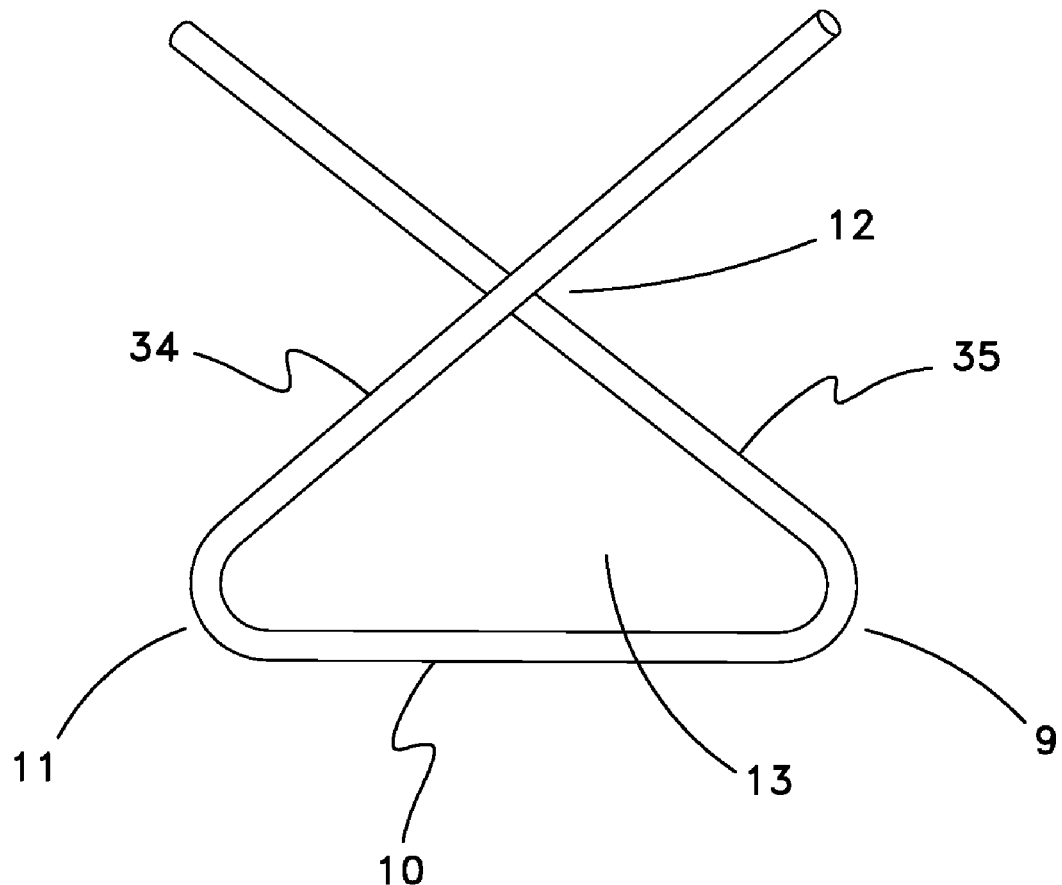
FIG. 3 shows a front view and a top view of a particular embodiment of a deterrent extensions invention.

Certain embodiments of the animal deterrent invention can comprise the deterrent extension (9) which can include a first deterrent extension element (34) having a first end and a second end and a second deterrent extension element (35) having a first end and a second end, so that the first deterrent extension element (34) and the second deterrent extension element (35) intercross (12). A base deterrent element (10) can be coupled to the first end of the first deterrent extension element (34) and to the first end of said second deterrent extension element (35) as shown in FIG. 3. An interchangeable animal deterrent mount (1) can be configured to the desired support surface (36). The mount (1) could be as shown in FIGS. 1 and 2, or could be configured like the insulated covers shown by FIGS. 8A-8E, 9A-9C, 10A-10C, or 11A-11C. As described above a portion of the length of the first deterrent extension element (34) or the second deterrent extension element (35), or both can extend beyond the location of the intercross (12).

Importantly, the position at which the intercross occurs can be adjusted depending on the application or species of animal to be deterred. Likewise the angle generated by the intercrossing of the deterrent extension elements can be adjusted depending on the application or species of animal deterred. By adjusting the position of the intercross (12) and adjusting the angle formed by the intercross the pre-measured area (13) defined by the deterrent extension elements and the base element and by adjusting the length of the extension elements extending beyond the intercross (12) a variety of animal deterrents can be configured to deter animals from a variety of species, for example, to deter various species of avian animals from perching in the proximity of the animal deterrent. Raptors, as a specific example, can be deterred from perching or landing in the proximity of electrical conductors.

Because of the invention's unique design, it can safely and easily be installed, and also can be safely and easily removed for required maintenance on the structure or otherwise. The simple design of the invention, and the use of weather resistant, non-corrosive parts, nearly eliminates the chance of the unit failing due to mechanical or structural breakdowns. Embodiments of the invention may be designed with the best interest of all three entities involved: The utilities who purchase the invention, the line worker who has to install the invention, and the birds and animals which will be protected by the invention.

Now referring primarily to FIGS. 8A-8E, another invention involves an insulating cover (14) and spiral conductor cover (15). One embodiment of the invention can include a snap-fit which involves resiliently flexible closure (16).

Figure 11A:
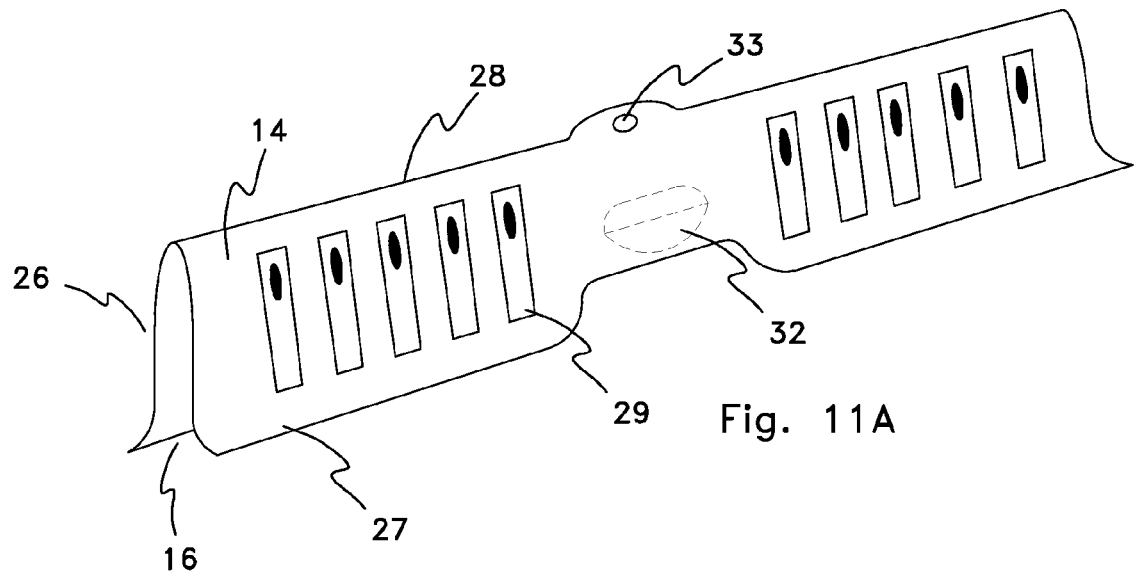
FIGS. 11A-C show particular embodiments of the insulating cover invention for use with electrical conductors.
Figure 11B:
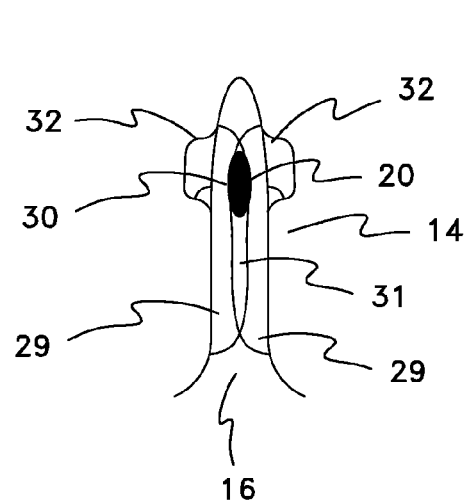
Figure 11C:
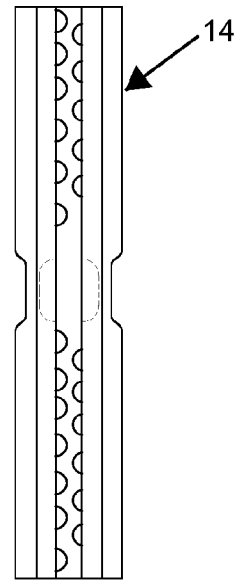

The snap-fit cover embodiment of the invention can be manufactured in the specific shape such as the top of a insulated bushing (17), as shown by FIGS. 8A-8E, the angled iron cross-lattice of a steel structure (18), as shown by FIGS. 9A-9C, the pole top insulator (19) as shown by FIGS. 10A-10C, or the conductor (20) as shown by FIGS. 11A-11C. When applied, the snap-fit cover may open, or flex enough to be applied or attached, and then can substantially return to the unopened original configuration or manufactured shape. Returning to the substantially original configuration of manufactured shape can hold the cover in place without the use of bolts, ties, wraps, and the like. The cover, which may be produced from plastic, fiberglass, PVC, or other semi-rigid, non-conductive material; molded, formed, or fabricated to fit the desired application.

Unlike other insulating devices, the snap-fit embodiment of the cover (14) can hold itself in place and cover the specific area desired. As an example, when attached to the top insulator on an electrical distribution line, the snap-fit cover embodiment of the invention can be made and placed to cover only the conductive portion of the structure: conductor, insulator ties and top of the insulator. The true advantage here is that a line worker can inspect the integrity of the insulator, prior to climbing the structure. This is an item of utmost concern with other insulating devices.

An attachment to the snap-fit insulating cover can be extending spiral conductor covers (15). These spiral conductor covers (15) can be produced as part of the snap-fit cover embodiment so that the insulating cover (14) and the spiral conductor covers (15) can be molded or formed in a unitized manner. The spiral conductor covers (15) can be molded, formed, or fabricated to fit the desired size and shape of the conductor where the unit is to be applied. As such, the extending spiral conductor covers (15) can then be wrapped from the insulator, or bushing, for a desired distance to add insulating value to the structure or apparatus.

At a point along or at the end of the spiral conductor covers (15), the spiral shape of the extending spiral conductor covers can have altered end wraps (21) to act as a vibration dampener, which will further protect the structure, conductor, or insulator.

The invention can also provide strategically placed formed eyes (22) or similar points to use for application purposes, may be formed or fabricated into the insulating caps (14) for ease of application of the insulating cover invention onto the structure to be protected.

The various embodiments of the invention can be formed or fabricated from 3/16 inch to 1/4 inch thick, Type I, Gray, Sunlight Resistant Polyvinyl Chloride (PVC). Because of PVC's dielectric properties, non-corrosive nature, and ease of formability, this material has been chosen although many materials could be used in the production of the various embodiments of the invention including, but not limited to, fiberglass, ABS plastic, or combinations there of. Another reason for choosing PVC is that it appears to be the most environmentally friendly of the plastic family, as the item is produced from only 57% petroleum products and 43% rock salt.

Sheets of the above-mentioned PVC may be cut down into usable sizes or formed from the raw material used. As there is a great variety of applications, and each being of a different size and dimension, each application may be cut or formed to size in order to be simpler to heat and to shape.

After pieces are size, the sections of PVC may be placed upon a flat screen surface, which is then placed into a preheated oven, (350-400 degrees). After approximately 3-7 minutes, depending on shape and thickness of product, of heating, the sheets of PVC become quite pliable. The sheets may at this time be removed from the oven and immediately placed into a press where, through varying bends and pressure, the hot PVC sheeting can be molded into the desired product. Another method of production may be to vacuum form the material over a pre-shaped mold.

If spiral ends and the end wraps (21) can be produced, from a single piece of material, the spirals may be formed around a desired size rod while the material is still warm and pliable.

Cooling time varies upon the temperature of the press, or form, and the thickness of the product. Nevertheless, when the material reaches a cooler temperature, and becomes semi-rigid in nature, it may be removed from the press and from the lengths of rod if used.

The formed product may then be cut into desired shapes and sizes, and trimmed, again depending on the application.

Again referring to FIGS. 8A-AE, an embodiment of an electrical insulation device can comprise an electrically insulated cover (14) having a separable juncture of a resiliently flexible closure (16) configured to enclose at least a portion of a cylindrical insulated bushing (17). A flexure element can be made responsive to said separable juncture in the electrically insulated cover. A first force transmission surface (23) and a second force transmission surface (24) can be coupled on either side of said separable juncture, whereby force applied to the first force transmission surface (23) and to the second force transmission surface (24) can open the separable juncture to allow insertion of the cylindrical insulated bushing (17) within the electrically insulated cover (14). The electrical insulation device as described above can further include electrical conductor access element (25) interpenetrating the electrically insulated cover. As shown in FIGS. 8A-8E, the electrical conductor access element (25) can be made responsive to the separable juncture.

Now referring primarily to FIGS. 8A-8E and 10A-10C, a broad embodiment of the invention can comprise electrical conductor insulation device that comprises an insulated cover (14) having at least one spiral conductor cover (15) joined to said insulated cover. As discussed above, the spiral conductor cover (15) can further include a electrical conductor vibration damper, such as an end wrap (21). The electrical conductor vibration damper can be made by configuring the free ends of the spiral conductor cover (15) to wrap more tightly about the electrical conductor.

In certain embodiments of the invention the insulated cover (14) can be configured to enclose at least a portion of an electrical component selected from the group consisting of an insulated bushing, a pole top insulator, a cylindrical insulated bushing, an insulated bushing restraining an electrical conductor, a pole top insulator restraining an electrical conductor, and a cylindrical insulated bushing restraining an electrical conductor, or the like.

Now referring primarily to FIGS. 11A-11C, another embodiment of the invention can comprise an electrical conductor insulation device comprising a first insulator element (26) having an interior surface and an exterior surface and a second insulator element (27) having an interior surface and an exterior surface. A flexure element (28) can be responsive to at least a portion of said interior surface of said first insulator element (26) and at least a portion of said interior surface of said second insulator element (27) to compress each toward the other. Certain embodiments of the invention can further comprise a plurality of electrical conductor compression elements (29) coupled to said interior surface of said first insulator element (26) and a plurality of electrical conductor compression elements coupled to said interior surface of said second insulator element (27), wherein the plurality of conductor compression elements coupled to the interior surface of the first insulator element and the plurality of conductor compression elements coupled to the interior surface of said second insulator surface can be interdigitatedly positioned.

Other embodiments of the electrical conductor insulation device can further comprise an indentation element (30) coupled to each of said plurality of electrical conductor compression elements configured to restrain an electrical conductor (20) within and in certain embodiments of the invention each said indentation element (30) can have sufficient size to allow a portion of the surface area of the plurality of conductor compression elements (29) coupled to said interior surface of said first insulator element (26) and a portion of said surface area of said plurality of conductor compression elements coupled to said interior surface of said second insulator surface (27) to interdigitatedly adjoin or overlap (31) upon restraint of said electrical conductor.

For those embodiments of the invention that are to be mounted upon an electrical conductor restrained by an electrical insulator, such as a pole top insulator, an electrical insulator enclosure element (32) can be coupled to the first insulator element (26) and the second insulator element (27) so that at least a portion of the electrical insulator can be compressed between.

When installation of the electrical conductor insulation device is likely to be accomplished only with the aide of a installation means, such as a "hot stick", pole, or the like, a releasable coupling element (33) can further be included in those embodiments of the invention.

As can be easily understood from the foregoing, the basic concepts of the present invention may be embodied in a variety of ways. It involves both techniques to insulate electrical conductors and to deter animals as well as devices to accomplish the appropriate insulation of conductors and deterrence of animals. In this application, the techniques are disclosed as part of the results shown to be achieved by the various devices described and as steps that are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this United States Non-provisional patent application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims included in this non-provisional patent application.

It should also be understood that a variety of changes may be made without departing from the essence of the invention. Such changes are also implicitly included in the description and are intended to still fall within the scope of this invention. A broad disclosure encompassing both the explicit embodiment(s) shown, the great variety of implicit alternative embodiments, and the broad methods or processes and the like are encompassed by this disclosure and may be relied upon in supporting the claims.

Further, each of the various elements of the invention and claims may also be achieved in a variety of manners. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action that physical element facilitates. Regarding this last aspect, as but one example, the disclosure of a "animal deterrent" should be understood to encompass disclosure of the act of "deterring animals"—whether explicitly discussed or not—and, conversely, were there effectively disclosure of the act of "deterring animals", such a disclosure should be understood to encompass disclosure of a "animal deterrent" and even a "means for deterring animals" Such changes and alternative terms are to be understood to be explicitly included in the description.

Any acts of law, statutes, regulations, or rules mentioned in this application for patent; or patents, publications, or other references mentioned in this application for patent are hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the Information Disclosure Citation or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim at least: i) each embodiment of the animal deterrent or electrical conductor insulator as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, and ix) methods and apparatuses substantially as described hereinbefore and with reference to any of the accompanying examples, x) the various combinations and permutations of each of the elements disclosed, and xi) each potentially dependent claim or concept as a dependency on each and every one of the independent claims or concepts presented.

In this regard it should be understood that for practical reasons and so as to avoid adding potentially hundreds of claims, the applicant may present claims with initial dependencies only. Support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

I claim:

1. An animal protectant power line electrical insulator comprising: a snap-fit insulating cover configured to fit over an energized part of an electrical structure of said power line; a resiliently flexible separable juncture of said snap-fit insulating cover for application of said snap-fit insulating cover onto said energized part of said electrical structure and secure closure of said snap-fit insulating cover onto said energized part of said electrical structure; an electrical conductor vibration dampener attached to said snap-fit insulating cover; and at least one formed eye on said snap-fit insulating cover to allow application by an electrically insulated rod having a hook to which said at least one formed eye of said snap-fit insulating cover is gripped by said hook of said electrically insulated rod and said snap-fit insulating cover is removed from or installed onto said energized part of said electrical structure.

2. An animal protectant power line electrical insulator according to claim 1 wherein said snap-fit insulating cover is an integral electrical conductor wrap.

3. An animal protectant power line electrical insulator according to claim 1 wherein said electrical structure is selected from a group consisting of an insulated bushing of said power line, a cylindrical insulated bushing of said power line, an insulated bushing restraining an electrical conductor of said power line, and a cylindrical insulated bushing restraining an electrical conductor of said power line.

4. An animal protectant power line electrical insulator according to claim 1 wherein said electrical structure comprises a pole top insulator.

5. An animal protectant power line electrical insulator according to claim 1 and further comprising at least one electrical spiral conductor insulator joined to said insulating cover.

6. An animal protectant power line electrical insulator according to claim 1 wherein said electrical structure comprise an angled iron cross-lattice of steel.

7. An animal protectant power line electrical insulator according to claim 1 wherein said resiliently flexible separable juncture of said snap-fit insulating cover comprises elastic memory.

8. An animal protectant power line electrical insulator according to claim 1 wherein said snap-fit insulating cover covers only a select portion of said electrical structure.

9. An animal protectant power line electrical insulator according to claim 1 wherein said electrical conductor vibration dampener comprises an altered end wrap.

10. An animal protectant power line electrical insulator according to claim 1 wherein said resiliently flexible separable juncture comprises a first force transmission surface and a second force transmission surface located on each side of said resiliently flexible separable juncture.

11. An animal protectant power line electrical insulator according to claim 1 and further comprising an electrical conductor access element responsive to said resiliently flexible separable juncture.

12. An animal protectant power line electrical insulator according to claim 1 wherein said snap-fit insulating cover comprises a plurality of electrical conductor compression elements configured to restrain said electrical structure.

13. An animal protectant power line electrical insulator according to claim 12 and further comprising an indentation element coupled to each of said conductor compression elements.

* * * * *